(12) United States Patent
Gold et al.

(10) Patent No.: US 6,893,154 B2
(45) Date of Patent: May 17, 2005

(54) INTEGRATED TEMPERATURE SENSOR

(75) Inventors: Spencer M. Gold, Pepperell, MA (US); Claude R. Gauthier, Fremont, CA (US); Brian W. Amick, Austin, TX (US); Kamran Zarrineh, Nashua, NH (US); Steven R. Boyle, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 68 days.

(21) Appl. No.: 10/080,037

(22) Filed: Feb. 19, 2002

(65) Prior Publication Data

US 2003/0156622 A1 Aug. 21, 2003

(51) Int. Cl.⁷ .......................... G01K 11/00; G01K 7/32; G01K 1/02
(52) U.S. Cl. ...................... 374/170; 374/117; 374/171; 377/25
(58) Field of Search .................. 374/170, 171, 374/117, 118, 1, 163; 327/512–513, 83, 362, 378, 540

(56) References Cited

U.S. PATENT DOCUMENTS

| | | | | |
|---|---|---|---|---|
| 3,791,214 A | * | 2/1974 | Keith ...................... 73/363 AR |
| 4,165,642 A | * | 8/1979 | Lipp ...................... 73/362 SC |
| 4,201,087 A | * | 5/1980 | Akita et al. ................ 73/339 A |
| 4,305,041 A | * | 12/1981 | Frerking ...................... 328/155 |
| 4,371,271 A | * | 2/1983 | Bellet ......................... 374/183 |
| 4,551,031 A | * | 11/1985 | Ishikawa et al. ............. 374/117 |
| 4,559,954 A | * | 12/1985 | Murase ........................ 128/736 |
| 4,658,407 A | * | 4/1987 | Iwama ......................... 377/25 |
| 4,692,710 A | * | 9/1987 | Shvartsman ................. 328/111 |
| 4,754,760 A | * | 7/1988 | Fukukita et al. ............. 128/660 |
| 4,905,701 A | * | 3/1990 | Cornelius .............. 128/660.01 |
| 5,085,526 A | | 2/1992 | Sawtell et al. |
| 5,097,198 A | * | 3/1992 | Holmdahl ................... 323/280 |
| 5,193,387 A | * | 3/1993 | Hodale ....................... 73/146.5 |
| 5,214,668 A | * | 5/1993 | Satou et al. ................ 374/117 |

(Continued)

OTHER PUBLICATIONS

Gunther et al. "Managing the impact of increasing microprocessor power consumption." pp. 1–9 http://www.intel.com/technology/itj/q12001/articles/art_4.htm (2001) Intel Technology Journal Q1.

Intel Corporation "Mobile Pentium ® II Processor and Pentium II Processor Mobile Module Thermal Sensor Interface specifications." 13 pages (Apr. 1998) http://www.intel.com/design/mobile/applnots/24372401.pdf.

Dallas Semiconductor, Application Note 105, "High Resolution Temperature Measurement With Dallas Direct-to--Digital Temperature Sensors" Retrieved from the Internet, www.dalsemi.com, pp. 1–20 (Aug. 11, 1999).

Dallas Semiconductor, Product Guide, "DS1721 2–Wire Digital Thermometer and Thermostat" pp. 1–14 (Dec. 29, 1998).

Intel Corporation 2000, Product Guide "Intel® Pentium® 4 Processor In the 423–pin Package Thermal Design Guidelines" Order Number:249203–001, pp. 1–28 (Nov. 2000).

Maxim Integrated Products "Maxim Remote/Local Temperature Sensor with SMBus Serial Interface: MAX1617" pp. 1–20 (Mar. 1998).

*Primary Examiner*—Gail Verbitsky
(74) *Attorney, Agent, or Firm*—Lahive & Cockfield, LLP

(57) ABSTRACT

An apparatus and method are provided for sensing a physical stimulus of an integrated circuit. The apparatus and method allow for accurate die temperature measurements of the integrated circuit and are able to provide a highly accurate die temperature measurement without the need for an independent voltage source or current source.

14 Claims, 5 Drawing Sheets

U.S. PATENT DOCUMENTS

| | | | |
|---|---|---|---|
| 5,291,607 A | | 3/1994 | Ristic et al. |
| 5,485,127 A | | 1/1996 | Bertoluzzi et al. |
| 5,490,059 A | | 2/1996 | Mahalingaiah et al. |
| 5,546,810 A | * | 8/1996 | Arikawa et al. ................. 73/2 |
| 5,626,425 A | * | 5/1997 | Fujikawa et al. ........... 374/163 |
| 5,638,418 A | * | 6/1997 | Douglass et al. ............. 377/25 |
| 5,781,075 A | * | 7/1998 | Bolton, Jr. et al. ......... 331/176 |
| 5,781,718 A | * | 7/1998 | Nguyen ................ 395/183.09 |
| 5,832,048 A | * | 11/1998 | Woodman, Jr. ............. 375/376 |
| 5,836,691 A | * | 11/1998 | Yamauchi ................... 374/117 |
| 5,838,578 A | * | 11/1998 | Pippin ........................ 364/488 |
| 5,870,614 A | | 2/1999 | Ang |
| 5,873,053 A | | 2/1999 | Pricer et al. |
| 5,892,408 A | * | 4/1999 | Binder ........................ 331/44 |
| 5,892,448 A | * | 4/1999 | Fujikawa et al. ........... 374/167 |
| 5,933,039 A | * | 8/1999 | Hui et al. ................... 327/262 |
| 5,953,640 A | * | 9/1999 | Meador et al. ............... 455/73 |
| 6,067,508 A | * | 5/2000 | Conn, Jr. .................... 702/132 |
| 6,098,030 A | | 8/2000 | McMinn |
| 6,115,441 A | | 9/2000 | Douglass et al. |
| 6,219,723 B1 | | 4/2001 | Hetherington et al. |
| 6,249,155 B1 | * | 6/2001 | Hartman et al. ............. 327/106 |
| 6,249,173 B1 | * | 6/2001 | Nakaizumi .................. 327/513 |
| 6,362,699 B1 | * | 3/2002 | Fry ............................. 331/176 |
| 6,363,490 B1 | | 3/2002 | Senyk |
| 6,463,396 B1 | | 10/2002 | Nishigaki |
| 6,695,475 B2 | * | 2/2004 | Yin ............................ 374/171 |
| 2001/0021217 A1 | | 9/2001 | Gunther et al. |
| 2002/0150141 A1 | * | 10/2002 | Kishi ......................... 374/141 |
| 2003/0038648 A1 | | 2/2003 | Gold et al. |
| 2003/0052331 A1 | | 3/2003 | Gauthier et al. |
| 2003/0155903 A1 | | 8/2003 | Gauthier et al. |
| 2003/0155964 A1 | | 8/2003 | Gauthier et al. |
| 2003/0155965 A1 | | 8/2003 | Gauthier et al. |
| 2003/0158683 A1 | | 8/2003 | Gauthier et al. |
| 2003/0158696 A1 | | 8/2003 | Gold et al. |
| 2003/0158697 A1 | | 8/2003 | Gold et al. |
| 2004/0037346 A1 | * | 2/2004 | Rusu et al. ................. 374/121 |

* cited by examiner

INTEGRATED TEMPERATURE SENSOR

REFERENCE TO RELATED APPLICATIONS

The present invention relates to five other applications filed on the same date: A Method and System for Monitoring and Profiling an Integrated Circuit Die Temperature Ser. No. 10/079,476, A Controller for Monitoring Temperature Ser. No. 10/079,475, Quantifying a Difference Between Nodal Voltages Ser. No. 10/078,945, Low Voltage Temperature Independent and Temperature Dependent Voltage Generator Ser. No. 10/078,140 and Temperature Calibration Using On-Chip Electrical Fuses Ser. No. 10/078,760.

TECHNICAL FIELD OF THE INVENTION

The present invention generally relates to integrated circuits, and more particularly, to a thermal sensor for an integrated circuit.

BACKGROUND OF THE INVENTION

Temperature gradients across the dies of today's high performance very large scale integration (VLSI) components, such as a microprocessor, can adversely affect component performance. For example, a temperature variation between two clock driver circuits within a microprocessor often results in a skew in the system clock of the microprocessor. Moreover, the die of the microprocessor may reach an unacceptable temperature that causes the microprocessor to malfunction or stop functioning.

To protect a microprocessor from thermal damage, a diode is typically placed in the die of the microprocessor to provide a die temperature indication. This diode is driven with a fixed amount of current, and the corresponding voltage drop across the diode provides an indication of the microprocessor temperature. Unfortunately, the diode provides a temperature reading that is accurate to about ±10° C., which is often not accurate enough to provide an early indication of a temperature abnormality. Moreover, a single diode is typically utilized to measure the die temperature of the entire microprocessor.

Given the size and complexity of current and future microprocessors, it is extremely difficult to determine a temperature gradient across the microprocessor using only a single diode positioned at a single location on the microprocessor die. As such, substantial variations in temperature across the die of the microprocessor can go undetected. Consequently, early indications that a thermal related problem exists in a portion of the microprocessor go undetected.

SUMMARY OF THE INVENTION

The present invention addresses the above-described limitations of sensing the temperature of an integrated circuit. The present invention provides a thermal sensor and a method to accurately sense the temperature of an integrated circuit.

In one embodiment of the present invention, a thermal sensor having an oscillator circuit and a counter circuit is provided to sense a temperature of an integrated circuit. The oscillator circuit generates a first oscillating reference signal that oscillates at a frequency substantially independent of the temperature of the integrated circuit. The oscillator circuit also generates a second oscillating signal at a frequency that varies depending on the temperature of the integrated circuit. The counter circuit is configured to include a first counter circuit to perform a count on the oscillating reference signal and a second counter circuit to perform a count on the temperature dependent oscillating signal. In operation, the oscillating reference signal oscillates at a higher frequency value than the frequency value of the temperature dependent oscillating circuit. In this manner, when the first counter of the counter circuit reaches a predetermined value, the first counter asserts an output signal that halts the second counter from performing the count on the temperature dependent oscillating signal. The count held by the second counter when the first counter asserts its output signal represents the sensed temperature of the integrated circuit. Once the second counter is halted, the count held by the second counter is shifted in a parallel manner to a shift register so that the temperature value can be serially shifted to a controller, such as a service microprocessor for further processing.

The counter circuit also includes a first synchronizer to synchronize the output signal of the first counter to the temperature dependent oscillating signal's frequency domain. This synchronized signal is utilized as a first control signal to halt the incrementing of the second counter. The counter circuit also provides a second synchronizer to synchronize the output signal of the first counter to the main system clock's frequency domain. This synchronized signal is utilized as a second control signal to trigger the loading of the serial shift register with the count held by the second counter. The first control signal asserted by the first synchronizer is also utilized to reset a counter register of the counter circuit utilized to hold the count on the temperature dependent oscillating signal.

The above-described approach provides an integrated circuit with an integrated thermal sensor capable of providing a temperature response with an accuracy of ±1.5° C. As a result, a temperature spike in a particular area of the integrated circuit can be more easily detected before a malfunction can occur due to an elevated temperature of the integrated circuit. In this manner, multiple thermal sensors can be placed at multiple locations throughout the die of the integrated circuit to accurately track and monitor the thermal profile of the entire integrated circuit.

In accordance with another aspect of the present invention, a method is performed in an integrated circuit having a thermal sensor to sense a die temperature of the integrated circuit. The sensor generates two oscillating signals. The first oscillating signal has a frequency value that is substantially independent of the die temperature of the integrated circuit while the second oscillating signal has a frequency value that is dependent upon the die temperature of the integrated circuit. A counter performs a first count on the first oscillating signal and a second count on the second oscillating signal until the first count of the first oscillating signal reaches a desired value. Upon reaching the desired value of the first count, the counter halts the second count of the second oscillating signal. The second count of the second oscillating signal is then sampled to indicate the die temperature of the integrated circuit as sensed by the thermal sensor. To ensure the accuracy of the second count of the second oscillating signal, the control signal utilized to halt the second count of the second oscillating signal is synchronized to the second oscillating signal's frequency domain. The control signal is further synchronized with an edge of a system clock signal to ensure that a shift register that asserts the second count of the second oscillating signal is holding stable data before it serially shifts data in unison with the system clock signal.

The above-described approach benefits a microprocessor architecture that utilizes an active sensor to report a die temperature of the microprocessor. As a consequence, the microprocessor is able to monitor and react to an unacceptable die temperature measurement by the thermal sensor without the processor malfunctioning or halting altogether. Moreover, the thermal sensor merely utilizes the system clock to synchronize the operation of a shift register that asserts the sensed die temperature of the integrated circuit. In this manner, the thermal sensor is still able to accurately sense a die temperature of an integrated circuit even if the system clock is slowed or throttled due to over temperature concerns of the integrated circuit or due to any other effect that would reduce the operating frequency of the system clock.

In yet another aspect of the present invention, a thermal sensor embedded in an integrated circuit that asserts a die temperature value is provided. The thermal sensor includes a sensor circuit that generates an oscillating reference signal and a temperature dependent oscillating signal. The oscillating reference signal generated by the sensor circuit is substantially temperature independent. The thermal sensor also includes an output circuit that converts the oscillating reference signal and the temperature dependent oscillating signal into the die temperature value.

BRIEF DESCRIPTION OF THE DRAWINGS

An illustrative embodiment of the present invention will be described below relative to the following drawings.

DETAILED DESCRIPTION

The illustrative embodiment of the present invention provides a thermal sensor that indicates a die temperature of an integrated circuit with an accuracy of ±1.5° C. In the illustrative embodiment, a thermal sensor of an integrated circuit is adapted to have an oscillator circuit to produce two oscillating signals and a counter circuit to convert the two oscillating signals into a value that represents the sensed die temperature of the integrated circuit.

In the illustrative embodiment, the thermal sensor is attractive for use in integrated circuits that desire a highly accurate die temperature measurement. The internal sensor operates in an independent manner, that is, without the need for an independent voltage or current source. Moreover, the thermal sensing properties of the thermal sensor are unaffected by frequency variation of the system clock. The illustrative embodiment allows for an active thermal sensor to be placed in multiple locations across an integrated circuit, such as a microprocessor to permit thermal profiling of the integrated circuit as its executes various functions, for example various code streams.

Figure 1:
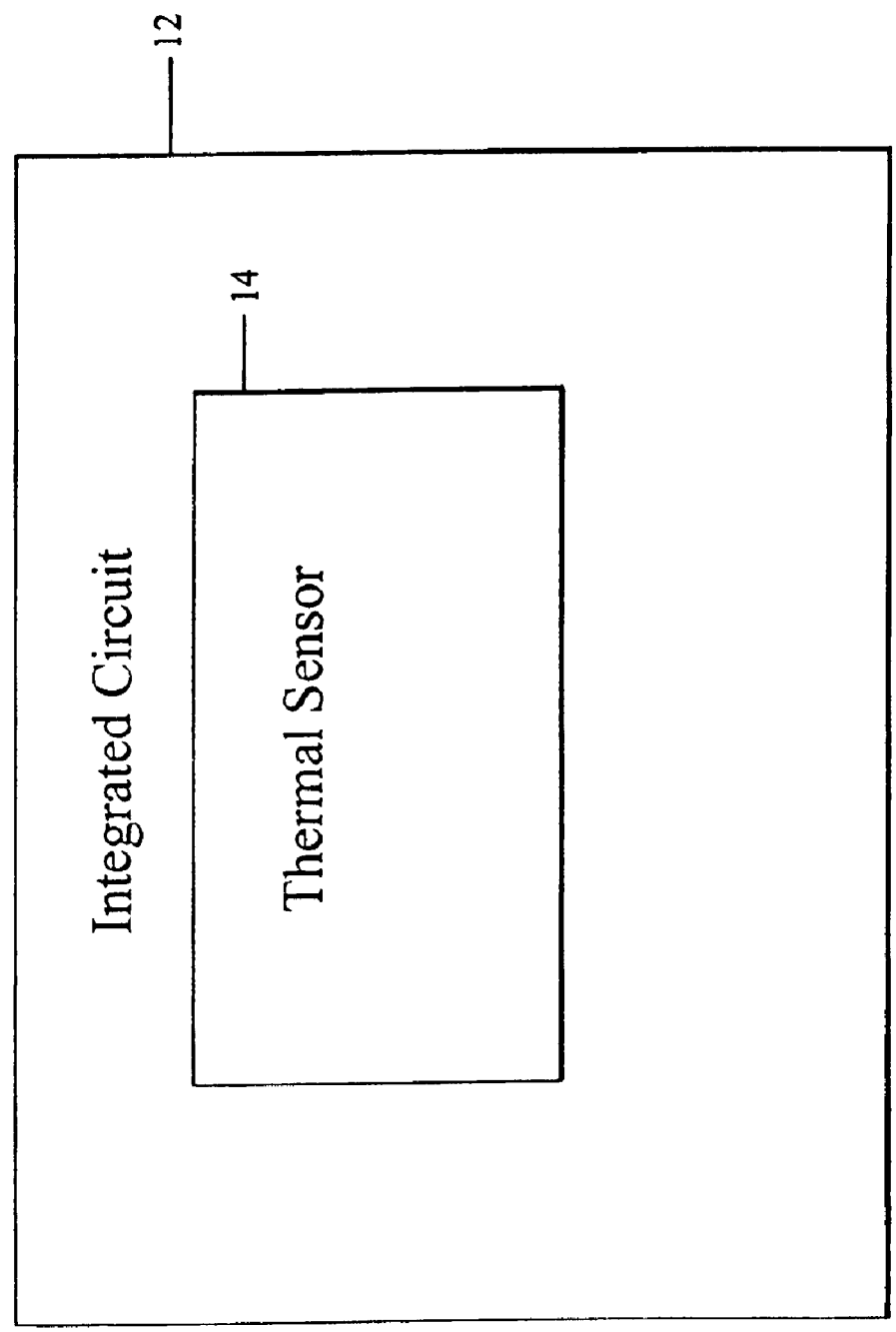
FIG. 1 depicts a block diagram of an integrated circuit suitable for practicing the illustrative embodiment of the present invention.

FIG. 1 is a block diagram of an exemplary integrated circuit 12 that is suitable for practicing the illustrative embodiment of the present invention. The thermal sensor 14 is an active device within the exemplary integrated circuit 12. The thermal sensor 14 is an independent sensor in that it operates without an independent current source or an independent voltage source. The thermal sensor 14 is embedded in the die of the exemplary integrated circuit 12 to provide an accurate die temperature measurement of the exemplary integrated circuit 12. The measurement accuracy of the thermal sensor 14 is about ±1.5° C. Those of ordinary skill in the art will recognize that the thermal sensor 14 can also be adapted to operate with an independent voltage source and an independent current source. In this manner, the thermal sensor 14 can be utilized as a calibration sensor to provide a baseline measurement of the exemplary integrated circuit 12 while the exemplary integrated circuit 12 is in a power down state. Moreover, those of ordinary skill in the art will recognize that the exemplary integrated circuit 12 can include more than one thermal sensor 14, for example two sensors, three sensors, four sensors or more depending on the die size of the integrated circuit or the number of areas that are to be monitored or both.

Figure 2:
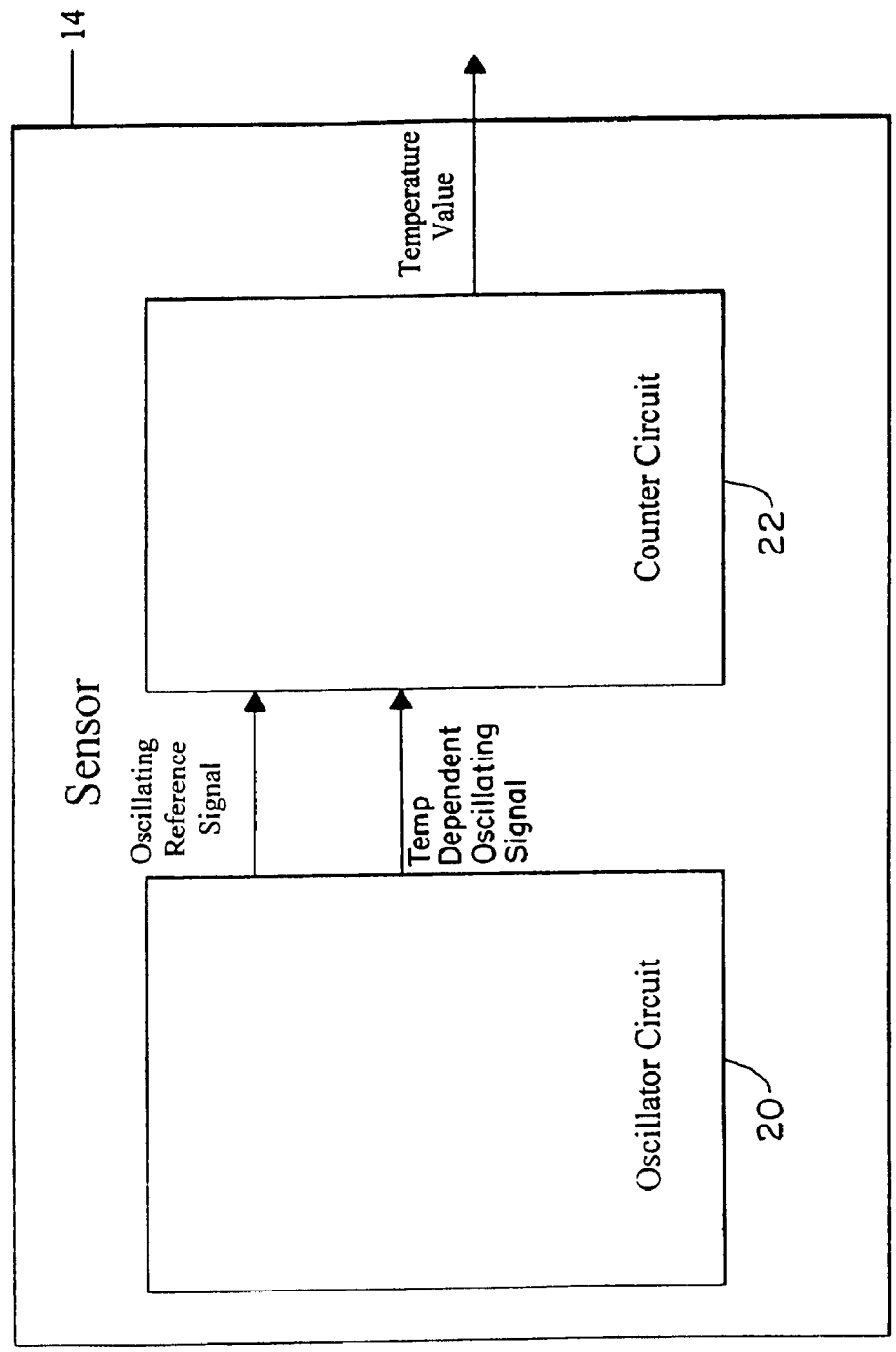
FIG. 2 illustrates a block diagram of the exemplary thermal sensor suitable for practicing the illustrative embodiment of the present invention.
Figure 4:
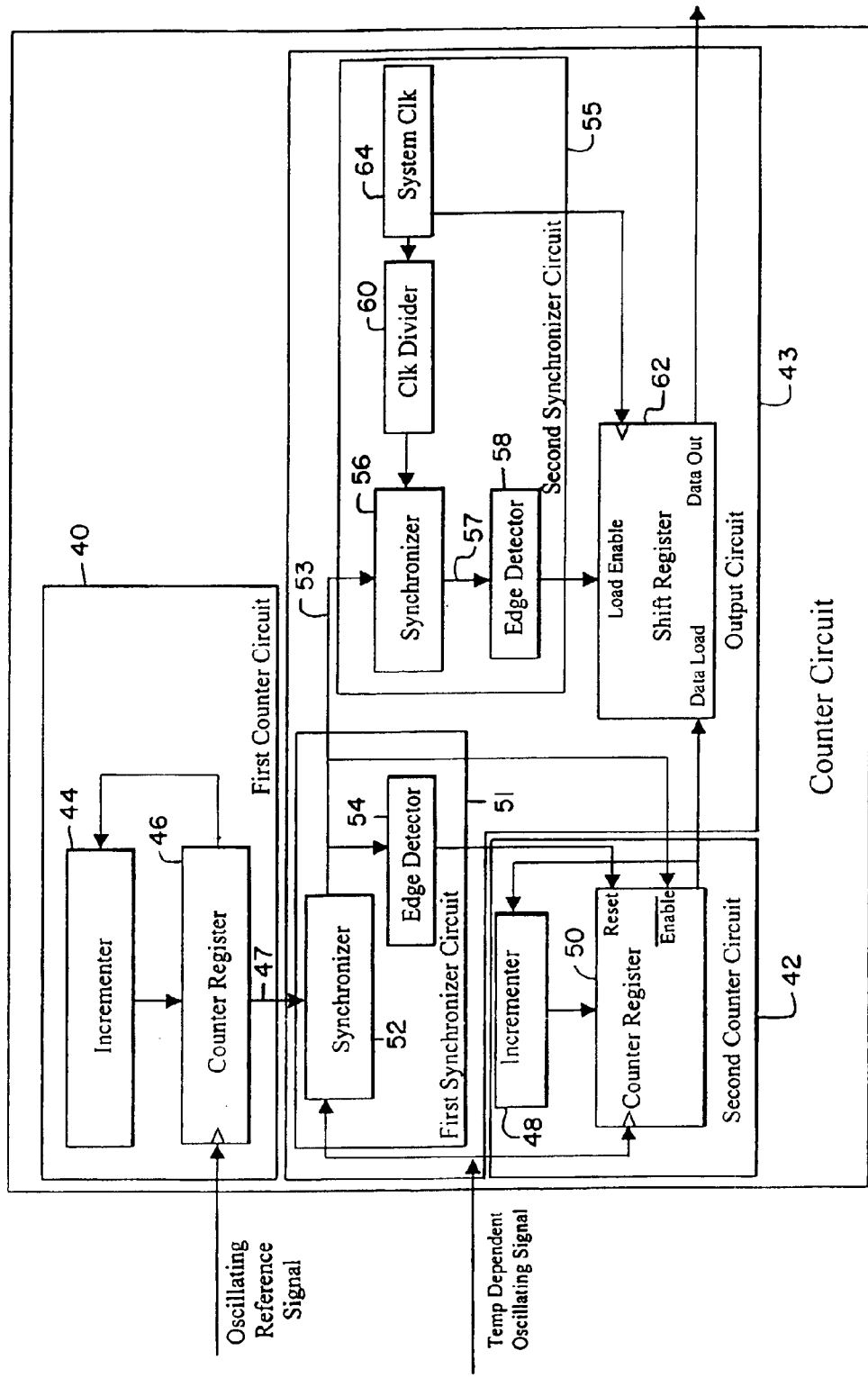
FIG. 4 depicts a block diagram of an exemplary counter circuit of the exemplary thermal sensor suitable for practicing the illustrative embodiment of the present invention.

FIG. 2 illustrates the thermal sensor 14 in more detail. The thermal sensor 14 is adapted to include an oscillator circuit 20 and a counter circuit 22. The oscillator circuit 20 generates an oscillating reference signal and a temperature dependent oscillating signal that drives the counter circuit 22. The counter circuit 22 performs a count on the oscillating reference signal and a count on the temperature dependent oscillating signal to determine a die temperature value of the exemplary integrated circuit 12. Those of ordinary skill in the art will recognize that the counter circuit 22 can perform the count of each signal asserted by the oscillator circuit 20 based on either a rising edge transition of each oscillating signal, a falling edge transition of each oscillating signal or based on any other suitable manner, for example, the number of zero-point crossings, or the like. When the count for the oscillating reference signal reaches a desired or predetermined value, a control signal within the counter circuit 22 is asserted to halt the count of the temperature dependent oscillating signal. To generate the control signal utilized to halt the count of the temperature dependent oscillating signal, an output signal 47 of the first counter circuit 40, which are illustrated in FIG. 4, is synchronized to an edge of the temperature dependent oscillating signal to ensure an accurate count. The control signal is then synchronized with a system clock signal of the exemplary integrated circuit 12 to control when the count of the temperature dependent oscillating signal is loaded in parallel into a shift register. The count loaded into the shift register represents the newest temperature measurement of the thermal sensor 14 and is shifted out of the thermal sensor 14 in serial fashion in conjunction with the system clock signal.

Figure 3:
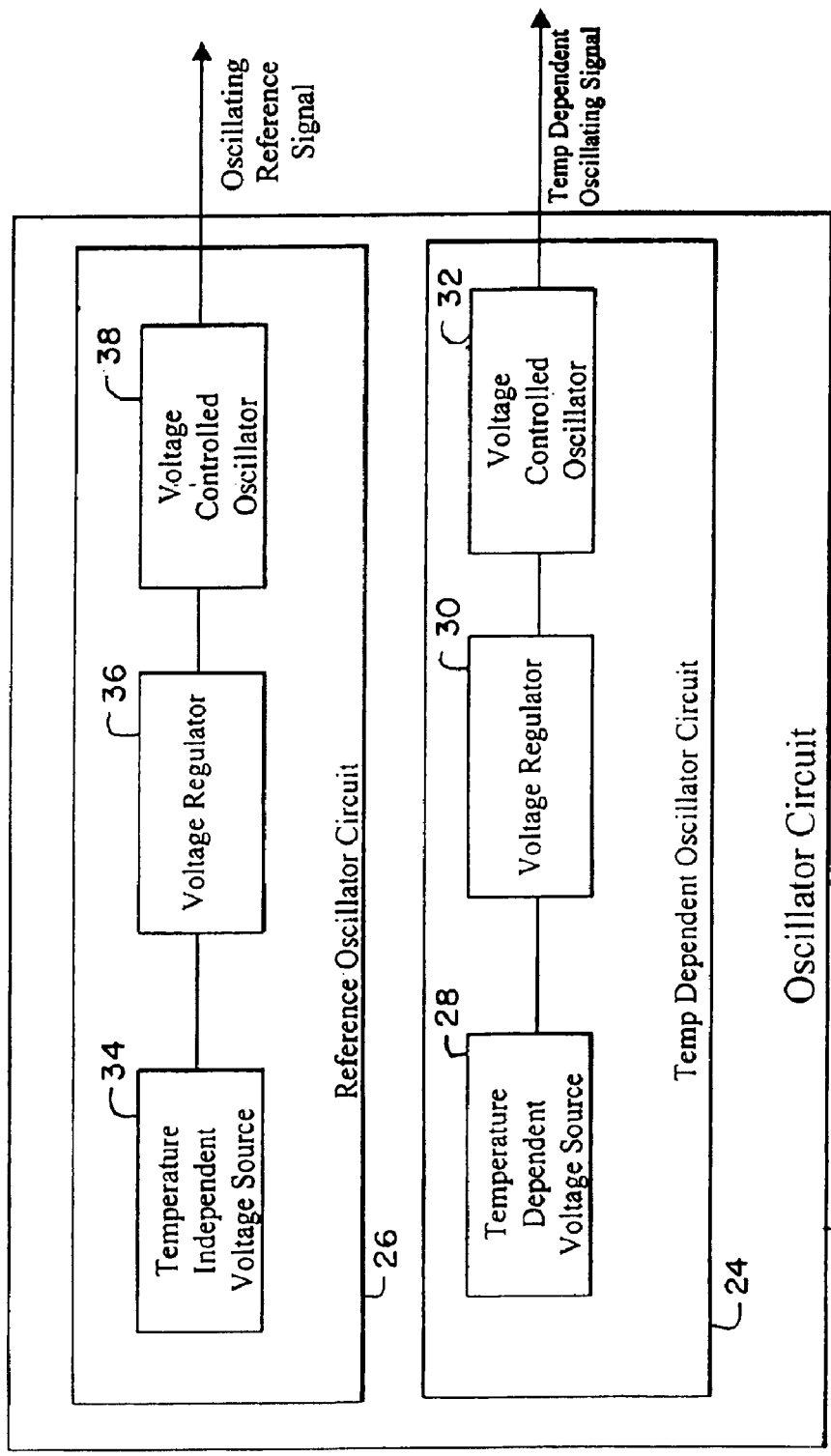
FIG. 3 depicts a block diagram of the oscillator circuit of the exemplary thermal sensor suitable for practicing the illustrative embodiment of the present invention.

FIG. 3 illustrates the oscillator circuit 20 in more detail. The oscillator circuit 20 is adapted to include a temperature dependent oscillator circuit 24 and a reference oscillator circuit 26. The temperature dependent oscillator circuit 24 generates the temperature dependent oscillating signal and the reference oscillator circuit 26 generates the oscillating reference signal. Typically, the oscillating reference signal oscillates at a higher frequency value than the temperature dependent oscillating signal.

The temperature dependent oscillator circuit 24 includes a temperature dependent voltage source 28 coupled to a voltage regulator 30 that drives the voltage controlled oscillator (VCO) 32 with a temperature dependent voltage signal to generate the temperature dependent oscillating signal. The temperature dependent voltage source 28 generates a voltage signal having a voltage value that is dependent upon the temperature of the substrate on which the die of the exemplary integrated circuit 12 is built. As the temperature of the substrate increases the voltage value of the voltage signal asserted by the temperature dependent voltage source 28 decreases. In contrast, as the temperature of the substrate on which the die of the exemplary integrated circuit 12 is built decreases, the voltage value of the voltage signal asserted by the temperature dependent voltage source 28 increases. The temperature dependent voltage source 28 is configured as a Delta Voltage base-emitter ($V_{BE}$) circuit. The temperature dependent voltage source 28 utilizes an output node of the Delta $V_{BE}$ circuit to generate the temperature dependent voltage signal. The output node utilized by the temperature dependent voltage source 28 is not affected by the current mirroring that occurs within the Delta $V_{BE}$ circuit to cancel a negative temperature coefficient and a positive temperature coefficient to generate the reference voltage signal that is discussed below in conjunction with the reference oscillator circuit 26. Those of ordinary skill in the art will recognize that the Delta $V_{BE}$ discussed above is also know in the art as a bandgap reference circuit.

The voltage regulator 30 operates to control the current drive to the VCO 32 which, in turn, significantly improves the power supply rejection ratio (PSRR) of the temperature dependent oscillator circuit 24. In this fashion, power supply noise associated with the power grid or bus that drives the oscillator circuit 20 can be dramatically reduced to ensure that the temperature dependent oscillator circuit 24 is desensitized to power supply noise. This allows the temperature dependent oscillator circuit 24 to generate a stable temperature dependent oscillating signal. Nevertheless, those of ordinary skill in the art will recognize that the temperature dependent oscillator circuit 24 can be configured to operate without the voltage regulator 30.

The VCO 32 generates a temperature dependent oscillating signal having a frequency value directly proportional to the voltage value of the temperature dependent voltage signal generated by the temperature dependent voltage source 28. In this manner, as the temperature of the substrate on which the die of the exemplary integrated circuit 12 increases, the voltage value of the temperature dependent voltage signal asserted by the temperature dependent voltage source 28 falls in value, which, in turn, results in the VCO 32 generating a temperature dependent oscillating signal with a lower frequency value. In contrast, if the temperature of the substrate on which the die of the exemplary integrated circuit 12 is built decreases, the temperature dependent voltage source 28 generates a temperature dependent voltage signal having a higher voltage value, which, in turn, results in the VCO 32 generating a temperature dependent oscillating signal having a higher frequency value.

The reference oscillator circuit 26 is adapted to include a temperature independent voltage source 34 coupled to a voltage regulator 36 to drive a VCO 38 with a substantially temperature independent voltage signal to generate the oscillating reference signal. The temperature independent voltage source 34 provides a voltage signal having a voltage value that is substantially independent of the substrate temperature on which the die of the exemplary integrated circuit 12 is built. Those of ordinary skill in the art will recognize that the temperature independent voltage source 34 can be configured as a $V_{BE}$ reference circuit or bandgap reference circuit. In operation, the bandgap reference circuit generates a differential voltage between two bipolar base emitter voltages ($V_{BE}$). Essentially, the bandgap reference circuit generates a voltage with a positive temperature coefficient having the same magnitude as the $V_{BE}$'s negative temperature coefficient, which are added together through a current mirroring technique to result in a voltage signal with a zero value temperature coefficient. Consequently, the voltage signal generated by the bandgap reference circuit is substantially independent of the die temperature of the exemplary integrated circuit 12.

The voltage regulator 36 current limits the voltage signal generated by the temperature independent voltage source 34 to significantly improve the PSRR of the reference oscillator circuit 26. In this manner, the voltage regulator 36 filters a significant amount of power supply noise associated with the power bus ($V_{DD}$) that provides power to the reference oscillator 26. Consequently, the oscillating reference signal generated by the VCO 38 is a more robust and stable signal.

The VCO 38 generates an oscillating reference signal having a frequency value directly proportional to the voltage value of the voltage signal generated by the temperature independent voltage source 34. The voltage value of the voltage signal generated by the temperature independent voltage source 34 remains substantially at the same voltage level regardless of an increase or decrease in the temperature of the substrate on which the die of the exemplary integrated circuit 12 is built. As such, the frequency value of the oscillating signal generated by the VCO 38 is substantially unchanged as the die temperature of the exemplary integrated circuit 12 increases or decreases.

From the discussion above, those of ordinary skill in the art will recognize that the temperature independent voltage source 34 and the temperature dependent voltage source 28 can be configured as a single voltage reference source, such as a bandgap reference circuit or as two distinct voltage reference sources, such as two bandgap reference circuits. Moreover, those of ordinary skill in the art will appreciate that the configuration of the oscillator circuit 20 offers a significant benefit in terms of noise immunity because Vss and substrate noise are common to both the temperature independent voltage source 34 and the temperature dependent voltage source 28.

FIG. 4 illustrates the counter circuit 22 in more detail. The counter circuit 22 is adapted to include a first counter circuit 40, a second counter circuit 42 and an output circuit 43. The first counter circuit 40 performs a first count on the oscillating reference signal generated by the reference oscillator circuit 26. The second counter circuit 42 performs a second count on the temperature dependent oscillating signal generated by the temperature dependent oscillator circuit 24. The output circuit 43 operates to assert the sensed die temperature as sensed by the thermal sensor 14. Those of ordinary skill in the art will recognize that the first counter circuit 40 and the second counter circuit 42 can be configured to perform their respective count in a number of ways. For example, the counters can perform a count based on a rising edge, a falling edge or both, a count based on the number of threshold crossings or any analog to digital conversion technique that is suitable to the needs of the application.

The first counter circuit 40 includes a counter register 46 coupled to an incrementer 44. The counter register 46 is clocked by the oscillating reference signal generated by the reference oscillator circuit 26. The first counter circuit 40 is an edge sensitive circuit that increments the value held by the counter register 46 by one for each received cycle of the oscillating reference signal. Those of ordinary skill in the art will recognize that the first counter circuit 40 can be configured to increase the count held by the counter register on either a rising edge or a falling edge of the oscillating reference signal. Moreover, those of ordinary skill in the art will recognize that the first counter circuit 40 can be configured to be either an up counter or a down counter to perform the count on the oscillating reference signal.

In operation, the counter register 46 is typically configured to be a twelve-bit register. The counter register 46 stores the current count of the oscillating reference signal as determined by the incrementer 44 until the counter register 46 reaches a maximum count value. When the counter register 46 reaches its maximum count value, it asserts an output signal 47 to the first synchronizer circuit 51. The incrementer 44 increments the count held by the counter register 46 by one in accordance with a detected edge of the oscillating reference signal. The incrementer 44 typically increments the count held by the counter register 46 by one upon the detection of a positive edge transition of the oscillating reference signal. Those of ordinary skill in the art will recognize that the first counter circuit 40 operates in a clock domain that is independent of the system clock domain for the exemplary integrated circuit 12. In this manner, the first counter circuit 40 can perform an accurate count on the oscillating reference signal over a wide range of system clock frequencies. This capability is significant should the system clock frequency be reduced or throttled to reduce power dissipation of the exemplary integrated circuit 12.

The second counter circuit 42 is adapted to include an incrementer 48 coupled to a counter register 50 to perform a count on the temperature dependent oscillating signal generated by the temperature dependent oscillator circuit 24. The counter register 50 holds the current count of the temperature dependent oscillating signal as determined by the incrementer 48. The incrementer 48 increments the count held by the counter register 50 by one upon detection of an edge of the temperature dependent oscillating signal. Typically, the incrementer 48 increments the count held by the counter register 50 by one for each detected rising edge of the temperature dependent oscillating signal. Nevertheless, those of ordinary skill in the art will recognize that the incrementer 48 can also be configured to increment the count held by the counter register 50 by one upon the detection of a falling edge of the temperature dependent oscillating signal. Those of ordinary skill in the art will recognize that the second counter circuit 42 operates in a clock domain that is independent of the system clock domain for the exemplary integrated circuit 12 and the clock domain of the first counter circuit 40. In this manner, the second counter circuit 42 can perform an accurate count on the temperature dependent oscillating signal over a wide range of system clock frequencies. This capability is significant should the system clock frequency be reduced or throttled to reduce power dissipation of the exemplary integrated circuit 12.

In operation, the counter register 50 is typically configured to be an eleven-bit register to hold the count determined by the incrementer 48. Those of ordinary skill in the art will recognize that counter register 46 is configured to hold at least one more bit than the counter register 50 because the oscillating reference signal typically has a higher frequency value than the temperature dependent oscillating signal. In this manner, the most significant bit of the counter register 46 can be used to generate the output signal 47, which, in turn, initiates assertion of the first control signal 53 to halt the count in the second counter circuit 42. Moreover, those of ordinary skill in the art will recognize that the number of bits that the counter registers 46 and 50 hold can vary depending on the application, the accuracy of the temperature measurement required and the like.

As indicated above, the incrementer 48 and the counter register 50 operate in a second time domain that is independent of the system time domain provided by the system clock driver 64 and the time domain of the first counter circuit 40. In this manner, the incrementer 48 and the counter register 50 are able to accurately measure the current die temperature of the exemplary integrated circuit 12 even if the system clock domain frequency is reduced to compensate for an over temperature condition in the exemplary integrated circuit 12. As such, those of ordinary skill in the art will recognize that the thermal sensor 14 operates with three distinct clock domains.

The output circuit 43 is adapted to include a first synchronizer circuit 51, a second synchronizer circuit 55 and a shift register 62. The first synchronizer circuit 51 synchronizes an edge of the output signal 47 from the counter register 46 and an edge of the temperature dependent oscillating signal to assert a first control signal 53. The second synchronizer circuit 55 synchronizes an edge of the first control signal 53 asserted by the first synchronizer circuit 51 with an edge of a system clock signal of the exemplary integrated circuit 12 to enable the loading of the shift register 62. The shift register 62 serially shifts out the count from the second counter circuit 42 to indicate the temperature value sensed by the thermal sensor 14.

The first synchronizer circuit 51 includes a synchronizer 52 to assert the first control signal 53 and an edge detector 54. The first control signal 53 asserted by the synchronizer 52 is coupled to the edge detector 54 to detect an edge transition of the first control signal 53 asserted by the synchronizer 52. The edge detector 54 is utilized to assert a reset signal to the counter register 50 upon the detection of a falling edge of the first control signal 53 to reset the counter register 50 to zero. The first control signal 53 asserted by the synchronizer 52 also provides the counter register 50 with an enable indication to begin a new count of the temperature dependent oscillating signal. Typically, the counter register 50 is adapted with an inverse logic enable. In operation, the first control signal 53 halts the count by the second counter circuit 42. The count held by the counter register 50 when the second counter circuit 42 is halted by the first control signal 53 represents a current temperature of the die of the exemplary integrated circuit 12 as sensed by the thermal sensor 14. The first control signal 53 asserted by the synchronizer 52 also drives a second synchronizer circuit 55.

The second synchronizer circuit 55 includes a system clock driver 64 that asserts the system clock signal. Also included in the second synchronizer circuit 55 is a synchronizer 56 and a clock divider 60. The clock divider 60 reduces the frequency value of the system clock signal asserted by the system clock driver 64 to ensure that the synchronizer 56 asserts a valid second control signal 57. Those of ordinary skill in the art will recognize that the clock divider 60 is an optional element that allows the illustrative embodiment to operate over a range of system clock signal frequencies. The second valid control signal allows a shift register 62 to be loaded with the current count held by the counter register 50. The second synchronizer circuit 55 also includes an edge detector 58 that is coupled to the output of the synchronizer 56 to detect an edge transition of the second control signal 57 asserted by the synchronizer 56. Upon detection of a positive edge transition of the second control signal 57 by the edge detector 58, the edge detector 58 asserts an enable signal to the shift register 62 to enable a parallel load of the current count held by the counter register 50. The system clock driver 64 also clocks the shift register 62 to serially shift out the count held by the shift register 62 for evaluation.

Figure 5:
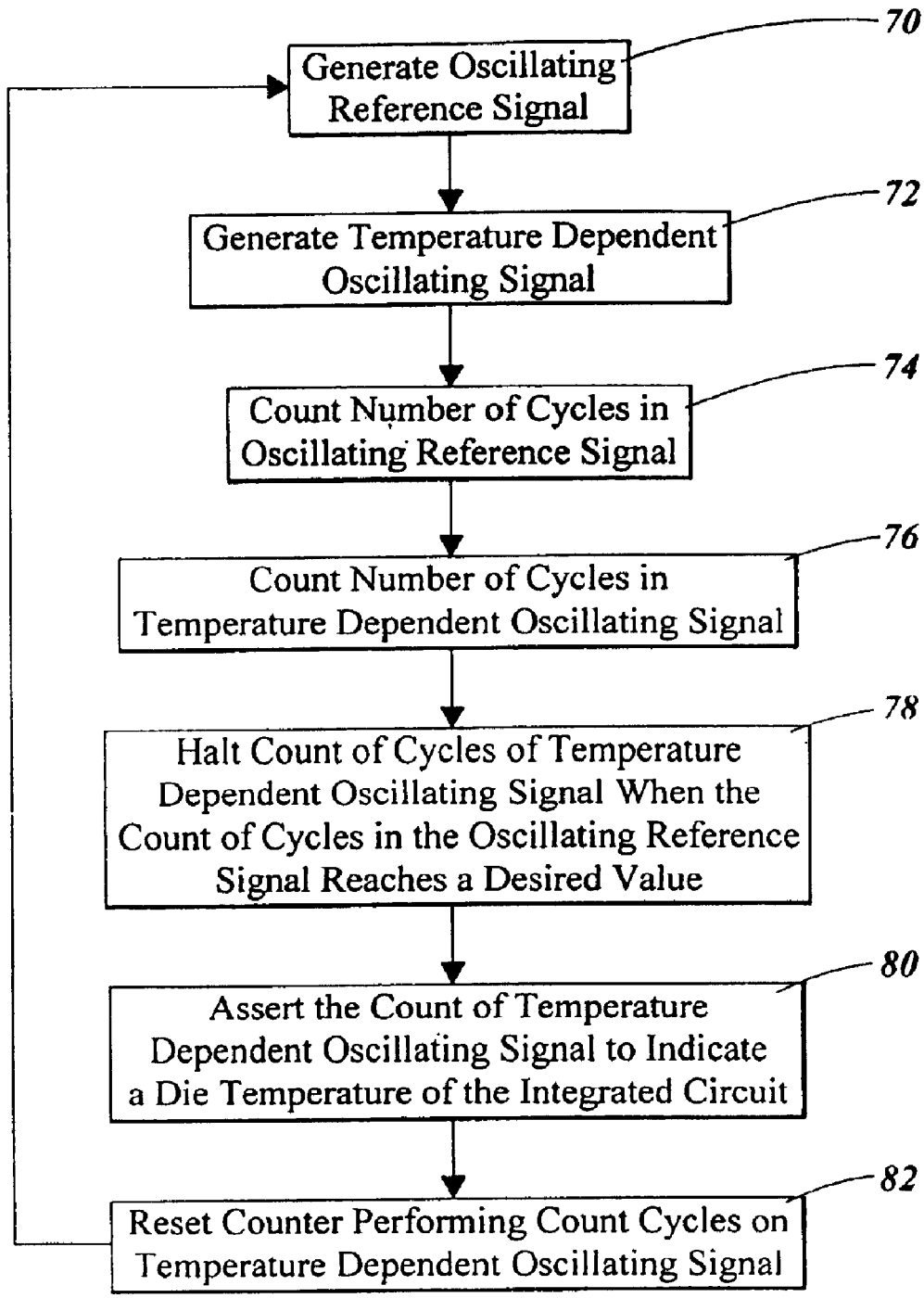
FIG. 5 is a flow diagram illustrating steps taken for practicing an illustrative embodiment of the present invention.

FIG. 5 illustrates the steps taken by the thermal sensor 14 to determine a die temperature of the exemplary integrated circuit 12. To sense a die temperature of the exemplary integrated circuit 12, an oscillating reference signal is generated (Step 70) and a temperature dependent oscillating signal is generated (Step 72). The oscillating reference signal typically oscillates at a higher frequency value than the temperature dependent oscillating signal. The oscillating reference signal and the temperature dependent oscillating signal are each provided to a counter which performs a count on the number of cycles in the oscillating reference signal (Step 74) and a count on the number of cycles in temperature dependent oscillating signal (Step 76). When the counter for the oscillating reference signal reaches a pre-determined value an output signal is asserted and synchronized to the temperature dependent oscillating signal to assert a first control signal (Step 78). The assertion of the first control signal causes the count for the temperature dependent oscillating signal to halt.

The first control signal is further synchronized with the frequency of a system clock signal to produce a second control signal 57. The second control signal 57 is monitored for a particular edge transition. When the particular edge transition is detected, the value stored by the counter performing the count of the temperature dependent oscillating signal is moved in parallel to a shift register to become the newest die temperature measurement of the thermal sensor 14. The shift register then asserts its newly loaded value in serial fashion to indicate a die temperature of the exemplary integrated circuit 12 (Step 80). At this point, the counter performing the count of the temperature dependent oscillating signal is reset to zero and the measurement process begins again once the output signal of the counter performing the count on the oscillating reference signal returns to a logic "0" level (Step 82).

While the present invention has been described with reference to a preferred embodiment thereof, one of ordinary skill in the art will appreciate that various changes in form and detail may be made without departing from the intended scope of the present invention as defined in the pending claims. For example, the shift register that is responsible for serially shifting the sensed die temperature value can be configured with additional control features such as a shift enable or with a scan data port to add additional functionality and ensure proper operation. Moreover, the shift register that shifts out the sensed die temperature value can be adapted to shift out the sensed temperature value in parallel fashion. The thermal sensor can be configured to assert a signal to indicate to a microprocessor that a current die temperature value is available. In addition, multiple thermal sensors can be coupled together in a single serial shift chain. Furthermore, the sensed die temperature value can be further processed, for example the die temperature measurement can be subtracted from 2048 and the three most significant bits could be dropped to provide an 8-bit value that has the measurement accuracy as the 11-bit value and so on.

What is claimed is:

1. A thermal sensor to sense a temperature comprising:
    an oscillator circuit to generate a first oscillating signal and a second oscillating signal; and
    a counter circuit having,
        a first counter circuit to perform a first count on said first oscillating signal, wherein said first counter circuit asserts an output signal when said first count reaches a predetermined value;
        a second counter circuit to perform a second count on said second oscillating signal, wherein upon assertion of said output signal by said first counter circuit said second counter circuit halts said second count and asserts a value of said second count after halting said second count;
        a first synchronizer circuit to synchronize an edge of said output signal of said first counter circuit with an edge of said second oscillating signal in order to assert a first control signal to halt said second count of said second oscillating signal by said second counter circuit;
        a second synchronizer circuit to synchronize an edge of said first control signal with an edge of a first clock signal to assert a second control signal; and
        a shift resister to receive in parallel said value of said second count held by a counter register upon receipt of said second control signal, wherein said shift register serially shifts said value of said second count to an output node to assert said temperature detected by said thermal sensor.

2. The thermal sensor of claim 1, wherein said oscillator circuit comprises,
    a reference oscillator circuit to generate said first oscillating signal that oscillates at a frequency substantially independent of temperature; and
    a temperature dependent oscillator circuit to generate said second oscillating signal that oscillates at a frequency dependent on said sensed temperature.

3. The thermal sensor of claim 2, wherein said reference oscillator circuit comprises,
    a temperature independent voltage source; and
    a voltage controlled oscillator (VCO), wherein said VCO generates said first oscillating signal based on a temperature independent voltage value asserted by said temperature independent voltage source.

4. The thermal sensor of claim 3, wherein said reference oscillator circuit further comprises, a voltage regulator to regulate an output value of the temperature independent voltage source.

5. The thermal sensor of claim 3, wherein said temperature independent voltage source comprises, a bandgap reference circuit.

6. The thermal sensor of claim 2, wherein said temperature dependent oscillator circuit comprises,
    a temperature dependent voltage source; and
    a voltage controlled oscillator (VCO), wherein said VCO generates said second oscillating signal based on a temperature dependent voltage value asserted by said temperature dependent voltage source.

7. The thermal sensor of claim 6, wherein said temperature dependent oscillator circuit further comprises, a voltage regulator to regulate an output value of the temperature dependent voltage source.

8. The thermal sensor of claim 6, wherein said temperature dependent voltage source comprises, a bandgap reference circuit.

9. The thermal sensor of claim 2, wherein said reference oscillator generates said first oscillating signal with a first frequency value.

10. The thermal sensor of claim 2, wherein said temperature dependent oscillator generates said second oscillating signal with a second frequency value.

11. The thermal sensor of claim 1, wherein said first counter circuit comprises,
    a counter register to hold said first count value of said first oscillating signal; and
    an incrementer circuit to increment said first count value of said first oscillating signal held by said counter register by one for an incrementing event detected by said first counter circuit.

12. The thermal sensor of claim 1, wherein said second counter circuit comprises, a counter register to hold said second count value of said second oscillating signal; and an incrementer circuit to increment said second count value of said second oscillating signal held by said counter register by one for each incrementing event detected by said second counter circuit.

13. The thermal sensor of claim 1, wherein said first synchronizer circuit further comprises, a detector circuit to detect an edge of said first control signal to assert a reset signal to said counter register of said second counter circuit to reset said counter register of said second counter circuit.

14. The thermal sensor of claim 1, wherein said second synchronizer circuit limber comprises, a clock divider circuit to reduce a frequency value of a second clock signal to generate said first clock signal; and a detector circuit to detect an edge of said second control signal to enable said shift register to receive in parallel said second count value held by said counter register.

* * * * *